Feb. 16, 1965  P. G. FINN-KELCEY ETAL  3,169,598
VEHICLES AND MEANS FOR GUIDING THEM
Filed June 21, 1961  6 Sheets-Sheet 1
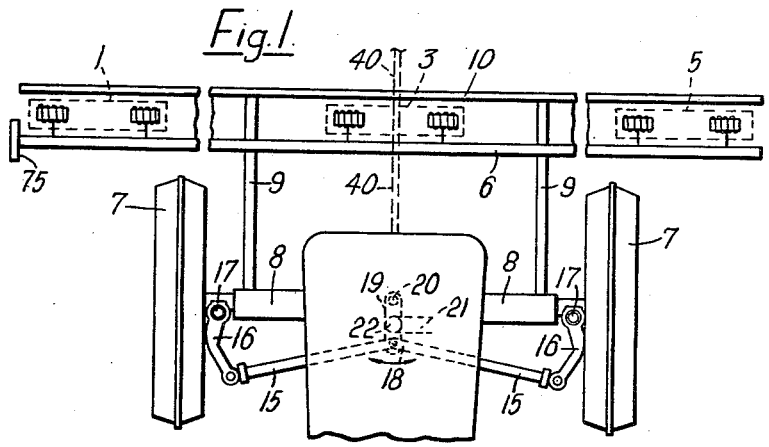
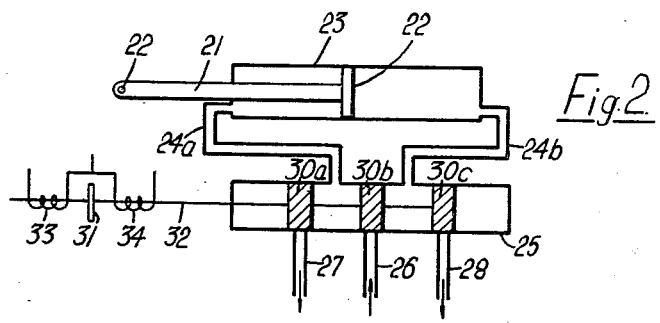
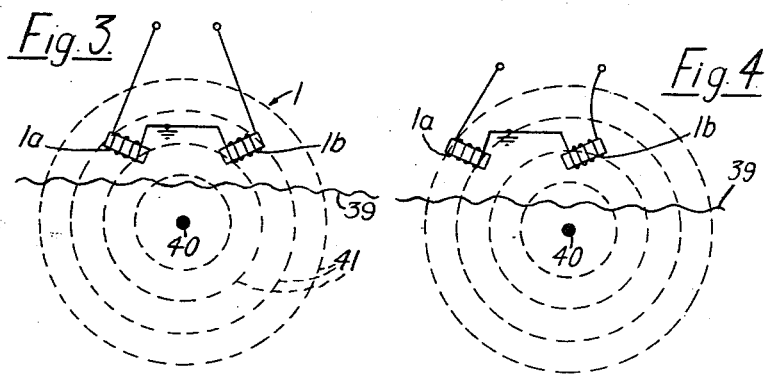
Inventors
PETER GERARD FINN-KELCEY
+ VAUGHAN MEYRICK OWEN
By
Mead, Browne, Schuyler + Beveridge.
Attorneys

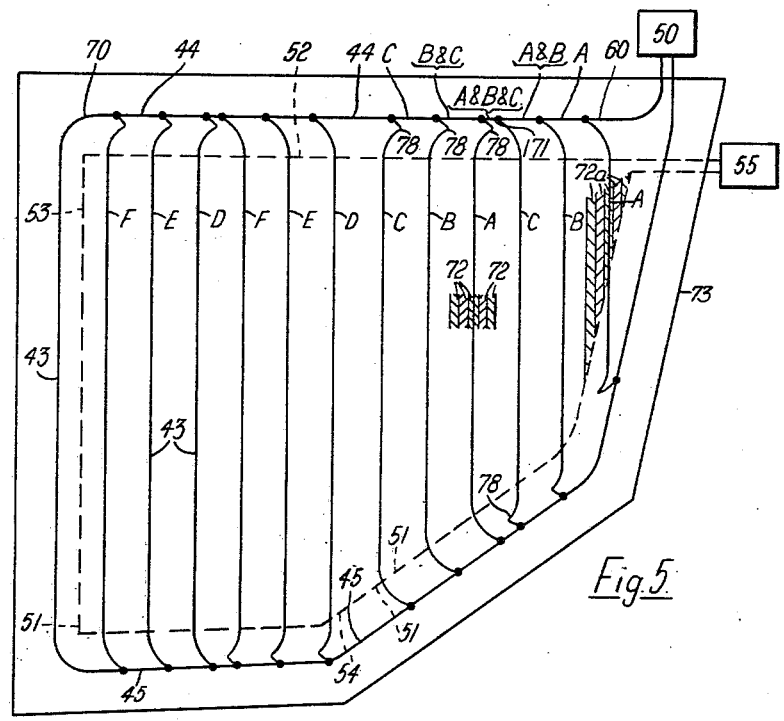
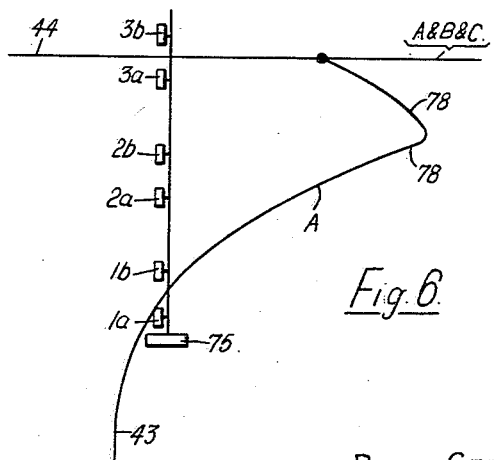

Inventors
PETER GERARD FINN-KELCEY +
VAUGHAN MEYRICK OWEN
By
Mead, Browne, Schuyler + Beveridge
Attorneys Feb. 16, 1965    P. G. FINN-KELCEY ETAL    3,169,598
VEHICLES AND MEANS FOR GUIDING THEM
Filed June 21, 1961    6 Sheets-Sheet 4
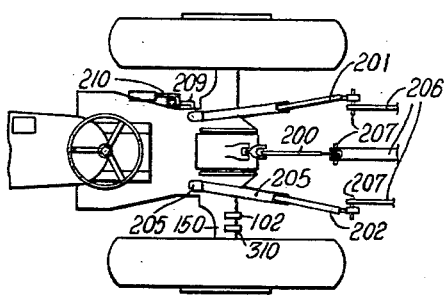
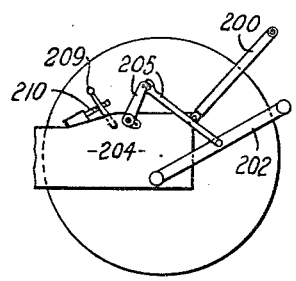
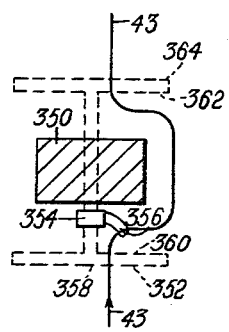
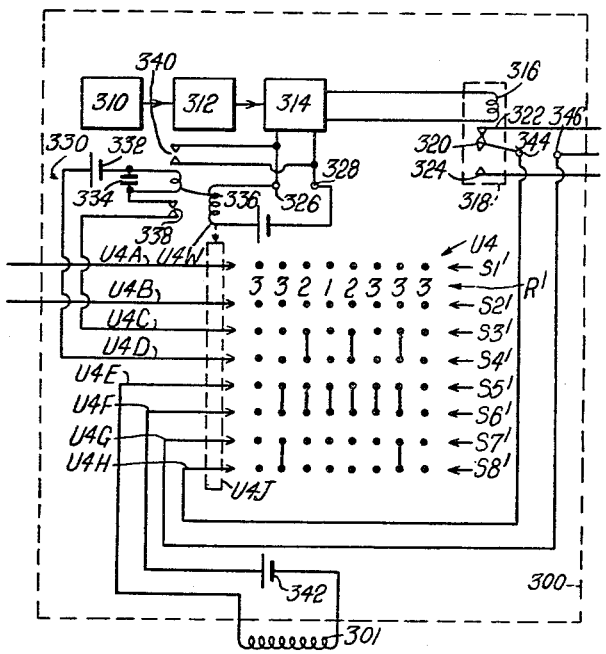
Inventors
PETER GERARD FINN-KELCEY +
VAUGHAN MEYRICK OWEN
By
Mead, Browne, Schuyler + Beveridge,
Attorneys Feb. 16, 1965   P. G. FINN-KELCEY ET AL   3,169,598
VEHICLES AND MEANS FOR GUIDING THEM
Filed June 21, 1961                6 Sheets-Sheet 6
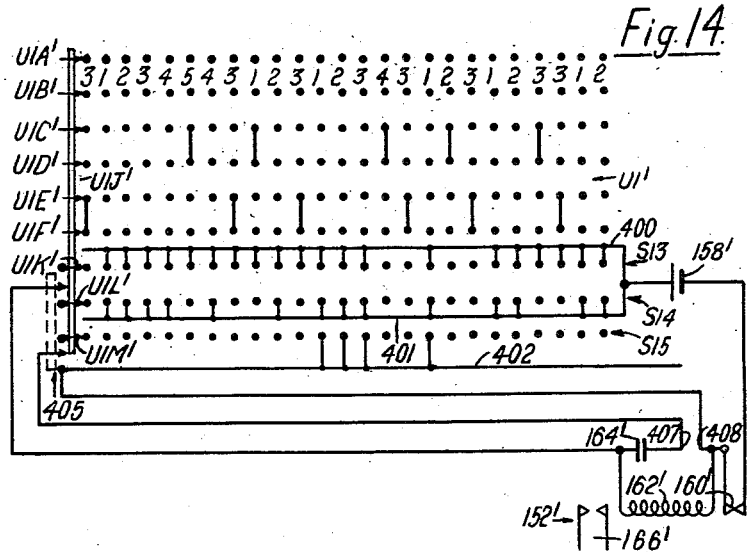
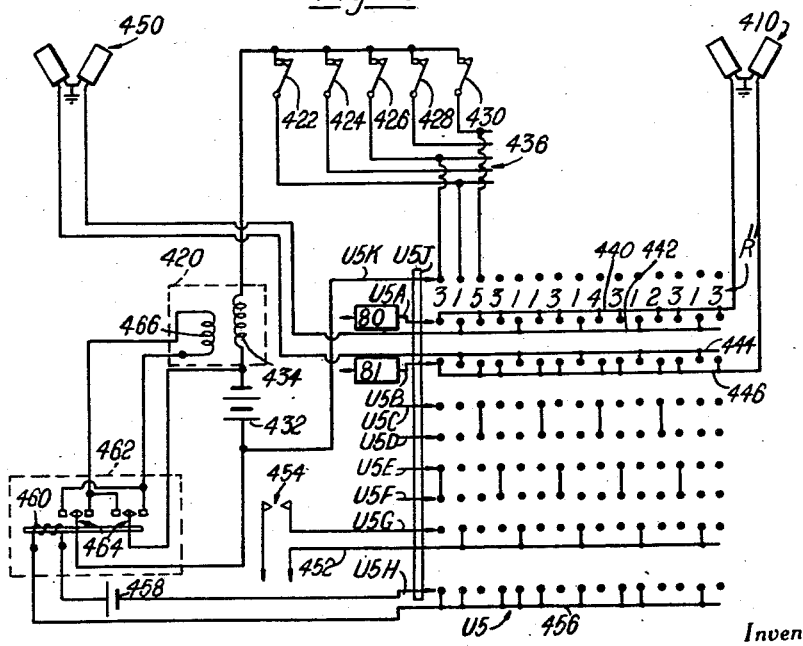
Inventors
PETER GERARD FINN-KELCEY
+ VAUGHAN MEYRICK OWEN
By
Mead, Browne, Schuyler + Beveridge
Attorneys United States Patent Office 3,169,598
Patented Feb. 16, 1965

3,169,598
VEHICLES AND MEANS FOR GUIDING THEM
Peter Gerard Finn-Kelcey, Eversley, Hants, and Vaughan Meyrick Owen, Reading, England, assignors to E.R.A. Patents Limited
Filed June 21, 1961, Ser. No. 118,590
Claims priority, application Great Britain, June 23, 1960, 22,022/60
41 Claims. (Cl. 180—79)

The present invention is concerned with vehicles and methods of automatically guiding them, and is concerned in particular with arrangements in which the guiding is effected by means of a conducting wire emitting signals which are picked up by a head which is mounted on the vehicle and which controls the steering device of the vehicle so that the vehicle automatically follows a path along the wire. Hitherto, the path along which the vehicle is to move has been determined completely by the arrangement of the conducting wire. Thus, if the vehicle is required to follow a to and fro path made up of a number of reaches, for example, a length of wire equal to the total length of the path has hitherto been required and this has been more expensive than is desirable. Particularly is this the case when the vehicle is in the form of a tractor which is required automatically to perform some agricultural operation, for example, ploughing, on a field where the wire must be buried in the ground.

According to the present invention, a vehicle is provided in which the head, or two or more such heads, have a number of different positions so as to pick up respective signals emitted at different laterally spaced positions, and the vehicle is provided with means to change, in response to a signal, the lateral position from which the control of the steering is exercised. A vehicle in accordance with this invention automatically follows a path along the wire, but this path need not be aligned with the wire but may be displaced towards or away from the wire in accordance with the means referred to. Thus a single wire is able to guide a vehicle along any one of a number of parallel paths, the path selected depending upon the lateral position from which the control of the steering device is exercised. Thus, if the vehicle were in the form of a tractor pulling a plough, it would theoretically be possible to plough a whole field with the aid of two parallel suitably connected conducting wires and appropriate wires near the ends of these parallel wires for providing the signals for controlling the said means. The parallel wires may, for example, be connected at one end or side of the field by a conducting wire of semicircular configuration, whilst at the opposite end or side a similar wire may be employed but split into two parts connected to respective busbars for supplying the necessary signal to the parallel wires. Other arrangements for connecting the parallel wires are of course possible. The steering device may initially be controlled from the pick up head (or, when more than one head is provided, from one of these heads) arranged centrally in the vehicle, to cause the vehicle to follow a path exactly aligned with the wire. At the end of its circuit, a signal may be applied to change the lateral position from which the control of the steering device is exercised so that the path followed is shifted away from one of the parallel reaches of the wire. During its turning motion to come back along the other reach a further signal may be applied to shift once again the lateral position from which the control of the steering device is exercised. This shift may be in the opposite direction to that taken initially, so that the wire lies to one side of the vehicle after the first shift and to the opposite side of the vehicle after the second. This is repeated until the whole area has been covered by the vehicle.

Preferably the head or heads themselves have a number of laterally spaced positions in the vehicle, rather than a number of different angular positions. With such lateral positions, the invention can be carried out in either of two different ways. First of all, there may be provided, for controlling the steering device, a head which is arranged to be moved into the different lateral positions by the said means, being arranged to be moved, for example, in a predetermined sequence by means of a uniselector. The head itself may be mounted on a boom carried by the vehicle and the boom may be fixed in position and may extend horizontally and perpendicular to the length of the vehicle, the head being moved along the boom to change its lateral position in the vehicle. On the other hand, the head may be fixed with respect to the boom and the latter may be mounted to move with respect to the vehicle. Thus the boom may be in the form of a swivelling arm which carries the head to the front of the vehicle, so that in effect the steering device has advance information of a corner to be negotiated. The arm is arranged to swivel, under the control of the means referred to, to move the head into different lateral positions in the vehicle.

In the alternative construction, there is a respective head at each lateral position and these heads are connected selectively to control the steering device through a switch device under the control of the means referred to. Thus with this alternative construction the steering device is controlled by whichever head is connected through the switch device. This switch device may be in the form of a uniselector which is arranged to connect the heads in a predetermined sequence to control the steering device.

When the vehicle is in the form of a tractor, a further head (conveniently referred to as the trip head) may be provided which is arranged to act, in response to a signal to centralise in the tractor the lateral position from which the control of the steering is exercised. Such a signal may be provided as the tractor reaches the end of each parallel reach so that in turning round to come into the next parallel reach the tractor follows a path aligned with the wire and does not, for example, follow a path so far out that the tractor touches the side of the field. A further trip head or this same trip head may be arranged also to act, in response to a series of signals, to move an implement raising and lowering control device so as alternately to raise and lower the implement. Such signals may be provided at the beginning and end of each parallel reach so that only land along these parallel reaches is treated by the implement.

The means referred to may be constituted by yet a further head (conveniently referred to as the counting head) which is connected to a counting device which counts the number of signals received by the counting head and which, on receipt of a predetermined number of signals, operates the switch device to change the lateral position from which the control of the steering device is exercised, the positions of the switch and thus the said lateral positions, having a predetermined sequence. When such a counting head is used (and such a counting head and device may be used when a movable head is employed to control the steering device), it is preferred to employ a particular electrical guidance system which constitutes part of the present invention. Such a system comprises a conducting wire embedded in the ground and forming a number of substantially parallel reaches connected at one end to a common first or head wire and at the other end to a common second or foot wire, the wire forming a series of interconnected loops defining a continuous path for a vehicle, each loop including within its area part of another loop so that a vehicle passing round a loop crosses another loop, and the system also includes an electrical signal source connected to the wire. With such a system, the counting head of a vehicle passing round each loop picks up signals from the other loop when the vehicle crosses it and such signals serve to operate the switch device as previously mentioned. Thus a single source of electrical signals is able both to guide the vehicle along the wire and also to change the lateral position from which the control of the steering device is exercised.

Tractors and electrical guidance systems in accordance with the invention will now be described, by way of example, with reference to the accompanying drawings in which:

FIGURE 1 is a plan of the front part of one tractor according to the invention, with parts broken away;

FIGURE 2 is a diagrammatic illustration showing part of the steering device of the tractor;

FIGURES 3 and 4 are elevations of one pick up head in symmetrical and unsymmetrical positions respectively with respect to a guidance wire;

FIGURE 5 is a plan of a field having a guidance system according to the invention;

FIGURE 6 is a plan of part of FIGURE 5 on an enlarged scale;

FIGURE 8 is a plan of the rear of the tractor;

FIGURE 9 is an elevation corresponding to FIGURE 8;

FIGURE 10 is a plan of an obstacle in the field shown in FIGURE 5;

FIGURE 11 is a circuit diagram of another part of the electrical network employed in the tractor;

FIGURE 14 is a diagram of part of a further electrical circuit which may be employed;

FIGURE 16 is a diagram of a circuit employed to control the lateral position of the head of the second tractor.

Figure 7:
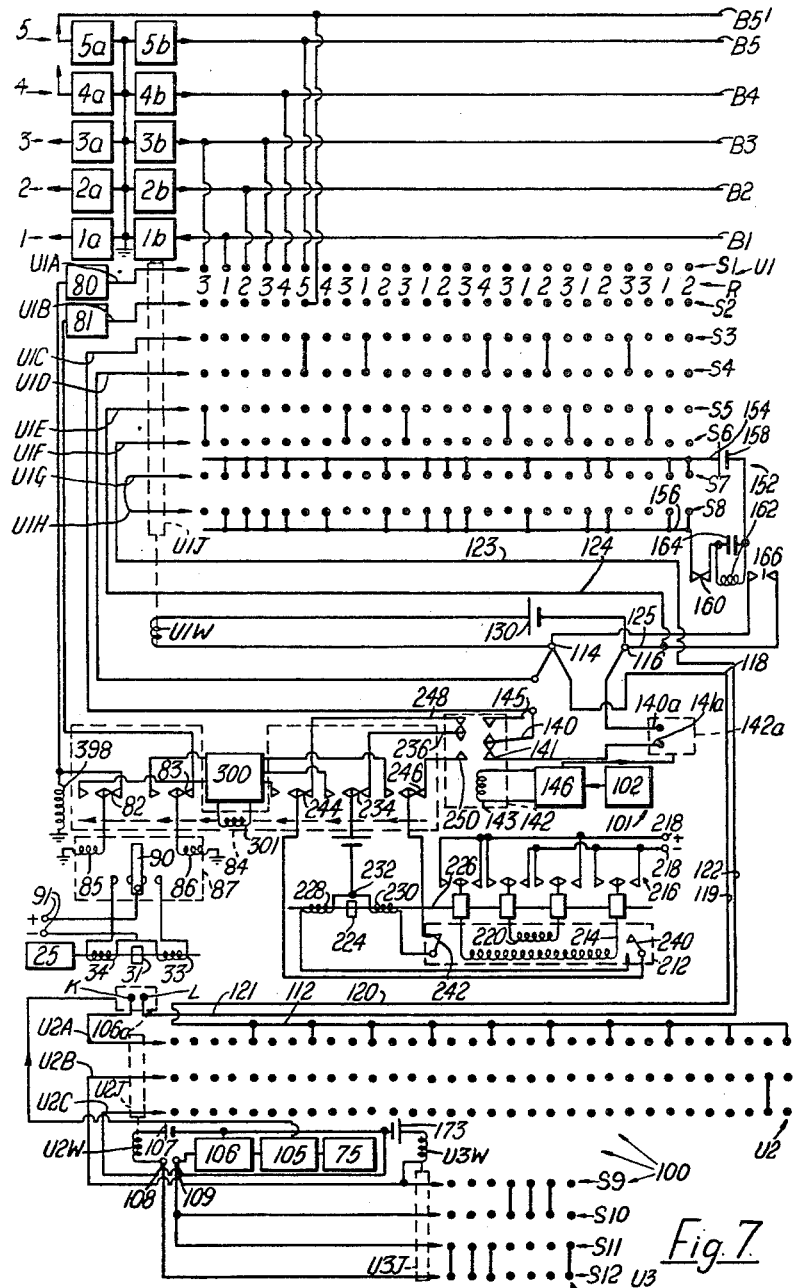
FIGURE 7 is a circuit diagram of part of the electrical network employed in the tractor.

The first tractor is one having a number of heads connected selectively through a switching device to control the steering device of the tractor. The front of the tractor is shown in FIGURE 1 and carries five pick up heads 1 to 5, the heads 1, 3 and 5 being shown in FIGURE 1 and all five heads being shown diagrammatically in FIGURE 7. The heads 1 to 5 are mounted on a boom 6 which extends perpendicular to the length of the tractor and which lies in front of the tractor wheels 7 at about the level of the front axle 8 of the tractor. The boom 6 is carried by the axle 8 through two rigid members 9 which extend forwardly of the boom 6 to carry a fender 10 which serves to protect the heads 1 to 5. The tractor is steered in a conventional manner by means of cross links 15 connected to the wheels 7 through arms 16 and king pins 17 and themselves moved in the direction of the arrows 18 by means of a lever 19 pivoted rigidly to the tractor frame at 20. The lever 19 is turned by means of a piston rod 21 which is connected to the lever 19 by a pivot 22 and which is shown in more detail in FIGURE 2. This piston rod 21 carries a piston 22 working in a hydraulically operated cylinder 23 connected at its opposite ends through pipes 24a and 24b to a hydraulic valve 25 having an inlet 26 for hydraulic fluid and two outlets 27, 28 for fluid. The valve 25 includes three pistons 30a, 30b and 30c which are connected rigidly together and to an armature 31 by means of a rod 32. The armature 31 is under the control of two opposed solenoids 33 and 34 which are under the control of the particular head which has been selected by the switch device. When no current is flowing through either solenoid 33 or 34 the armature 31 is held in a central position by means of a spring (not shown) which holds the pistons 30a, 30b, 30c in the illustrated positions. In these positions hydraulic fluid is unable to enter or leave the valve 25 through the pipes 26 to 28 and as a consequence the piston rod 21 and the rest of the steering device are held in such a position to keep the wheels 7 straight as illustrated. If, on the other hand, current flows through either the solenoid 33 or the solenoid 34 the pistons 30a, 30b, 30c move to the left or right respectively and thereby cause the piston rod 21 to move to the left or right so that the wheels 7 turn to the right or left respectively to turn the tractor out of its previous path.

The heads 1 to 5 are spaced out at equal intervals along the boom 6, there being a gap of 2½ feet between the centres of the different adjacent heads in the illustrated tractor. The central head 3 is disposed centrally with respect to the tractor as shown in FIGURE 1.

Each head comprises two separate coils which are spaced apart by about a foot and which are shown at 1a, 1b, 2a, 2b and so on in FIGURE 7. The two coils of each head are helical coils which are inclined to the horizontal at equal angles as shown in FIGURES 3 and 4 and which have axes which intersect substantially at ground level, indicated at 39. Embedded in the ground is an electrically conducting guide wire 40 which on being connected to an alternating electric source sets up a magnetic field which is indicated in dotted lines at 41 and which acts as a magnetic signal. When the two coils, for example, 1a and 1b, are symmetrically disposed with respect to the wire 40 electric signals of equal strength are induced in the two coils and this is arranged, as will subsequently be described in more detail, to ensure that no current flows through the solenoids 33 and 34, so that the tractor continues to follow its previous path. If, however, the two coils become asymmetrical with respect to the wire 40, as shown in FIGURE 4, a larger signal is induced in the coil 1b than the coil 1a and these signals act to operate the steering device shown in FIGURES 1 and 2 to bring the tractor once more into a position in which the coils are symmetrically disposed with respect to the wire 40. In this way, the tractor is guided along a path defined by the wire 40.

Before describing the electrical network which is to bring the heads 1 to 5 into selective operation to control the steering device, the objects which are to be fulfilled by the tractor will first be described with reference to FIGURE 5, which shows a field which is to be ploughed.

This field is provided with an electrical guidance system comprising the conducting wire 40 which is conveniently covered in plastic to resist deterioration and provide insulation and which is conveniently .025" diameter gauge. This wire 40 is embedded in the ground at a depth of some 14 inches to form a series of interconnected loops A–F which define a continuous path for the tractor. It will be noticed that each loop, for example loop A crosses a number of other loops. Thus, the loop A crosses the loops B and C at both top and bottom ends. The wire 40 is in the form of a number of parallel reaches 43 which at one end are connected to a common first or head wire 44 and at their other end to a common second or foot wire 45, the head and foot wires being connected to an electrical signal source 50 which provides the guidance system with alternating current signals of one kilocycle per second frequency.

A further conducting wire 51 similar to the wire 40 is also embedded in the ground at a depth of some 22 inches and extends first parallel to the head wire, and crossing the parallel reaches 43 as indicated at 52, then extending down towards the foot wire as indicated at 53 and then extending parallel to the foot wire and again crossing the parallel reaches 43 as indicated at 54. The wire 51 lies about 33 feet from the head and foot wires 44 and 45. The ends of this wire 51 are connected to a second electrical signal source 55 providing alternating current signals of frequency of 4 kilocycles per second.

The tractor is required to start at the position 60, make five complete circuits of the loop A and then five complete circuits of the loop B and so on, finally finishing at the point 70 after five complete circuits of the loop F. In its five different passages along each reach 43 a different head is made effective in controlling the steering device so that when the tractor is connected to a plough which ploughs a width of land 2 feet 6 inches wide five different non-overlapping stretches of land indicated at 72 and 72a are ploughed, these stretches straddling the reaches 43 and extending half-way to the adjacent reaches as shown at 72 or to the limit of the wire 51 as shown at 72a. The sequence of operation of the heads is such that the stretch 72 which is nearer the end 73 of the field is ploughed first and the others in order, ending with the stretch furthest from the end 73.

The wire 51 acts, as will be described in more detail later, to move a plough raising and lowering control device so as to lower the plough at the beginning of each reach 43 and raise it at the end, so that when the tractor reaches the position 70 the area within the dotted line will have been ploughed.

The wire 51 also serves to act on the tractor as it reaches the end of each reach 43 to centralise the position from which the control of the steering is exercised, that is to say serves always to bring the central head 3 into operation to control the steering device. In this way the tractor is always brought into a position straddling the wire 44 or 45 in making its turn at either the head or foot end of each loop, respectively.

The switching of the heads 1 to 5 is effected by means of a further pick-up head (the counting head) which is disposed on the boom 6 adjacent to the head 1 and which is shown at 75. In proceeding from the position 60 along the head wire 44 this counting head 75 passes over first the loop A, then the loop B, then the loop C, and finally the loop A again, the latter position being illustrated in detail in FIGURE 6. As it reaches each of these loops the counting device picks up a signal and in the position illustrated in FIGURE 6 the counting head 75 is therefore about to receive a fourth signal. On receiving such a signal switching is automatically effected to switch from the head 3 (which as previously indicated is in control of the steering device when the tractor is moving along the head wire 44) to the head 1 which at that time is disposed vertically above the loop A. This head 1 then takes over control of the steering to guide the tractor into the left-hand reach 43 of the loop A. It will be noticed from FIGURES 5 and 6 that each parallel reach 43 at one end curves gently into the head or foot wire 44, 45 to bring the tractor smoothly into line with this wire, whilst the adjacent end of the other parallel reach of the loop approaches the head or foot wire in a re-entrant fashion indicated at 78. This re-entrant part is provided to ensure that the tractor proceeds straight along the head wire 44 until the counting head 75 reaches the loop A, thus avoiding any need to provide switching at the junction between the loop A and the head wire 44.

The electrical network by means of which the steering device is controlled is shown in FIGURE 7 and includes a switching device in the form of a uniselector which is shown purely diagrammatically at U1. This uniselector U1 has eight sets of contacts S1–S8 which in reality are arranged in a circle. Eight corresponding contact arms U1A–U1H are mounted upon an arm U1J which in reality is arranged to sweep round the contacts in a series of steps under the control of the uniselector winding, shown at U1W. In the drawing one can imagine the arm U1J moving from left to right so as to move the contact arms U1A–U1H out of contact with one column of contacts and into engagement with the next column.

The top two sets of contacts S1 and S2 are connected in a predetermined fashion to ten different busbars of which five are shown at B1–B5 and another at B5′. The busbars B1–B5 are connected respectively to ends of the coils 1b–5b, whilst the other five busbars are connected in a similar way to ends of the windings 1a–5a. The opposite ends of the coils 1a–5a and 1b–5b are all earthed. In this way, the busbar B3, for example, receives the signal given by the coil 3b.

The contacts of the top set S1 are connected to the busbars B1–B5 in the way indicated by the row of FIGURES R whilst the contacts of the second set S2 are connected in the same way to the corresponding busbars connected to the coils 1a–5a. Thus, with the contact arms U1A–U1H engaging the first column of contacts the contacts U1A and U1B receive the signals from the coils 3b and 3a respectively.

These signals are amplified by respective amplifiers 80, 81 and then passed through respective normally closed contacts 82, 83 of a change-over relay indicated in dotted lines at 84 to respective windings 85 and 86 of a relay indicated in dotted lines at 87. When the signals derived from the coils 3a and 3b are equal the currents passing through the windings 85 and 86 are also equal and the armature 90 of the relay 87 thus maintains a central position so as to keep open the circuit between input terminals 91 and the two solenoids 33 and 34 which control the steering device. If, however, the signal from one of the coils 3a, 3b is greater than the other the armature 90 is moved over in one direction or the other by the windings 85, 86 so as to cause application of current to one or other of the windings 33, 34 to operate the steering device in the way previously indicated.

If now the coil U1W is energized to move the arm U1J by one step the head 3 is switched out and the head 1 switched in and the tractor is then turned until the head 1 lies over the guide wire 40.

Energization of the winding U1W is effected under the control of two separate circuits indicated generally at 100 and 101 which include respectively the counting head 75 and a further or trip head 102. The counting head 75 is connected to an amplifier 105 which is tuned to the frequency of the source 50 and which acts, therefore, whenever the head 75 reaches a part of the wire 43 to close a relay 106 and also a relay 106a having normally open contacts K, L. This relay 106 is connected in series with a battery 107 and with the winding U2W of a second uniselector U2 conveniently referred to as the main counting uniselector. The connection between the relay 106 and the winding U2W is through connections 108, 109 which are joined together by means of a third uniselector U3 (conveniently referred to as the subsidiary counting uniselector) when the tractor is at the position 60.

Thus, as the tractor proceeds from the position 60 along the head wire 44 (see FIGURE 5) the counting head 75 picks up four signals up to the time it reaches the downward part of the loop A and as a consequence the winding U2W is energized four times so as to move the arm U2J of the main counting selector U2 to the right by four steps. The arm U2J carries three contact arms U2A–U2C and these are all moved to the right in steps. During the first three steps the arm U2A engages contacts which are not connected to anything but at the end of the fourth step it reaches a contact connected to a busbar 112. In this way two terminals 114 and 116 are connected together, being connected through conductors 118, 119, 120, the busbar 112, the contact arm U2A, the contacts K and L, conductors 121, 122, 123, the contact arms U1E and U1F (which themselves are connected together by the left-hand contacts of the set S5, S6 since these contacts themselves are connected together in the uniselector U1) and then conductors 124 and 125. The uniselector winding U1W is thus energized by a battery 130 and the arm U1J moves one step to the right to bring the head 1 into operation to control the steering.

However, this operation is only temporary since in reaching its second position the arm U1J brings the two contact arms U1G and U1H, which are connected electrically together into engagement with contacts in the sets S7 and S8 which contacts are connected in a delay circuit 152. This delay circuit 152 includes two busbars 154 and 156 which are connected to the two contacts of the sets S7 and S8 and which are connected in series through a battery 158, two normally-closed contacts 160 and, arranged in parallel with one another, a coil 162 and a capacitor 164. When the contacts of the sets S7 and S8 are connected together through the contact arms U1G and U1H the battery 158 charges up the capacitor 164 and at the same time energizes the coil 162 so as to open the contacts 160 and close a pair of normally open contacts 166, these contacts then being held closed for a predetermined time whilst the capacitor 164 discharges through the coil 162. Thus, for a predetermined time the terminals 114 and 116 are connected together and this serves to energize the coil U1W so as to move the arm U1J through a further step into its third position in which the head 2 is effective to control the steering device. In this new position the arm U1J again brings the delay circuit 152 into operation, and indeed this happens several times until the head 5 is brought into operation, the arm U1J then being in its sixth position.

Thus, in attaining the reach 43 of the lefthand part of the loop A the head 5 is effective and remains so along the whole of this reach.

In the sixth position of the arm U1J the contact arms U1E and U1F are disconnected so that the counting selectors U2 and U3 are rendered ineffective in causing further energization of the winding U1W. However, the contact arms U1C and U1D are now connected by means of the contacts in the sets S3 and S4, and as will appear later, this provides another possibility of joining the terminals 114 and 116 to energize the winding U1W. However, until the tractor reaches the part 52 of the wire 51, these terminals 114 and 116 are disconnected by both normally open contacts 140a, 141a of a relay 142a, and by a both-sides-stable relay 142, which has a central contact 140 movable between side contacts 141, 145, remaining in engagement with the contact 141 after receipt by the relay winding 143 of one signal, and remaining in engagement with the other contact 145 after receipt of the next signal, and so on. These signals are derived from an amplifier 146 which is tuned to the frequency of the source 55 and which is connected to the pick-up head 102 previously mentioned. This head 102 which is mounted on the back axle 150 of the tractor as shown in FIGURE 8, acts both to raise or lower a plough raising and lowering device, described later, and to shift the lateral position from which the control of the steering device is exercised.

It is necessary to provide the isolated contact 145 because of this dual function of the head 102, for two signals from the head 102 are required at the head or the foot of the field for raising and lowering the plough respectively (or for controlling the operation of any other implement, as indicated later) but only one of these signals is required for controlling the steering of the tractor and this is to occur on reaching the head or foot of the field. The other signal, obtained when entering a reach 43, acts to move the contact 140 into engagement with the isolated contact 145, so that no energization of the winding 1W is possible. Thus as the head 102 passes over the wire 51 with the tractor passing into the left hand reach 43 of the loop A, the signal applied to the relay 142 moves the contact 140 to leave the contact 141. At the same time a signal is applied to the relay 142a to close its contacts 140a, 141a, but this relay has a built-in delay of half to one second which ensures that this closure takes place only after the disconnection of the contacts 140, 141. When the signal stops, the contacts 140a, 141a open, but the contacts 140, 145 remain together. This signal obtained from the head 102 has merely moved the contact 140 from one position to the other.

The tractor proceeds down the reach 43 of the lefthand part of the loop A with its steering device under the control of the head 5. On reaching the bottom part 54 of the wire 51 the head 102 receives a further signal which after amplification is applied to the relays 142 and 142a to bring the contact 140 into engagement with the contact 141 and also the contact 140a into engagement with the contact 141a. This serves after a short delay occasioned by the relay 142a, to connect the terminals 114 and 116 together again to energize the winding U1W and move the arm U1J to the right through one further step. This brings the head 4 into operation to control the steering device. The delay circuit is energized once more to move the arm U1J so that the head 3 is operative.

The tractor thus turns round at the bottom end of the loop under the control of the head 3, and the counting head 75 counts the signals received as it crosses the loops B and C and acts to move the arm U2J onwards one step at a time. By the time that the head 75 has reached the righthand part of the loop A this arm U2J has been moved into its eighth position, a position in which the arm U2A is connected once more to the busbar 112. This connection, together with the connection between contacts K and L and the connection between the eighth pair of contacts of the sets S5 and S6 of the uniselector U1 serves to connect together the terminals 114 and 116 to energize the winding U1W again. The arm U1J thus moves into its ninth position in which the head 1 is effective in controlling the steering device. The tractor thus proceeds along the reach 43 on the righthand part of loop A with its steering device under the control of the head 1.

As the trip head 102 passes over the wire 51 at the foot of the field the relay 142 moves the contact 140 upwards and then, on reaching the part 52 of the wire 51 at the top end of the field again moves the contact 140 downwards into engagement with the contact 141. Since in the ninth position of the arm U1J the contact arms U1C and U1D are in electrical connection through the contacts of the sets S3 and S4 this causes energization of the winding U1W to move the arm U1J forward by one step. The delay circuit 152 then acts as previously to move the arm U1J forwards by a further step to bring the head 3 into operation again.

The above operations thus take the tractor round the loop A once and these operations are repeated five times to take the tractor round the loop A five times. For the different circuits different heads are effective one after the other, heads 5 to 1 being selected in sequence for the lefthand reach 43 of the loop A whilst heads 1 to 5 are selected in sequence for the righthand reach. All the contacts of the uniselector U1 are not shown, but are connected up to give this effect.

When the tractor reaches the end of its fifth circuit the arm U2J has returned to its starting position. The whole sequence is then repeated starting with four counts made by the head 75 which then takes the tractor on to the loop B, around which it goes five times. This is then repeated for loop C.

The tractor thus makes five complete circuits of each of the loops A, B and C and finally ends at a position 171 on the head wire 44 (FIGURE 5) from which it must pass into the loop D. For this purpose it is required that the counting head 75 count seven received signals rather than the three or four hitherto. The uniselector U3 is provided for this purpose. This uniselector U3 has an arm U3J which moves in a series of steps over the contacts of the uniselector under the control of a winding U3W energized by a battery 173. The uniselector U3 has four sets of contacts S9–S12 which are arranged in pairs and which in reality are arranged around a circle. In the first position of the arm U3J the two contacts of the sets S11, S12 are connected together and this serves to connect together the terminals 108, 109, a connection which was previously assumed. The first contacts of the sets S9 and S10, however, are not connected together so that in this position of the arm U3J the relay 106 cannot cause the energization of the winding U3W. Such energization can, however, be effected by the uniselector U2, for when the arm U2J reaches the thirty first position its two contact arms U2B and U2C are connected together to complete the circuit for current through the winding U3W. Thus after completing five circuits of the loop A the arm U3J is moved forwards by one step into a second position similar to the first and after passing round the loop B five times the arm U3J moves into a third position similar to the first. On completing five circuits of the loop C, however, the arm U3J moves into a fourth position which differs from the others in that the contacts of the sets S9 and S10 are connected together and those of the sets S11 and S12 are disconnected. Because of this disconnection the relay 106 cannot now energize the winding U2W so that the main counting uniselector U2 is inoperative. This relay 106 does, however, cause the energization of the winding U3W through the contacts of the sets S9 and S10 every time a signal is received by the counting head 75. The arm U3J is in fact moved forwards on each occasion that the counting head 75 crosses the righthand (FIGURE 5) branches of the loops D, E and F but finally on reaching the lefthand branch of the loop D the arm U3J moves into a position in which the contacts of the sets S9 and S10 are not connected together whilst those of the sets S11 and S12 are connected. The whole system thus reverts to its original condition ready to make the circuits of the loops D, E and F in turn, the tractor finally ending at the position 70.

It will be appreciated that the two uniselectors U2 and U3 constitute a counting device which has a predetermined programme such that the operation of the uniselector U1 takes place sometimes after receipt by the head 75 of three signals and sometimes after receipt of four. Other programmes could obviously be provided both for effecting circuits of the first set of loops A, B and C and for causing the tractor to move from one set of loops to the next. Furthermore by providing the uniselectors with a sufficiently large number of contacts the tractor may, after leaving the point 70, be caused to pass right round the field five times for the purpose of ploughing the border of the field.

The head 102 effects not only the centralisation of the lateral position from which the control of the steering device is exercised but also controls a plough raising and lowering device which is shown in more detail in FIGURES 8 and 9. This device is conventional in Massey-Ferguson tractors and is shown purely diagrammatically. This device includes a centrally disposed top link 200 and two lower draft links 201 and 202, pivoted at their front ends to the frame 204 of the tractor. The two lower links 201 and 202 are connected to a hydraulic actuator for raising and lowering movement through a linkage 205 which includes the usual crank arms and drop links. The front of the plough assembly indicated at 206 in FIGURE 8 is connected to the links 200–202 by means of releasable pins 207. The raising and lowering of the links is normally effected by hydraulic actuator which is under the control of a hand operated lever 209 on the side of the tractor. As shown in FIGURE 9, however, a member 210 is provided which is able automatically to move the lever 209 to raise and lower the links 200–202 and which itself is under the control of an electric motor indicated in dotted lines at 212 in FIGURE 7. This motor 212 is provided with an armature winding 214 which is connected through an electric switch 216 to terminals 218 which, irrespective of the operative position of the switch 216 is arranged to supply the armature winding 214 with current in the same direction. The motor 212 also has a field winding 220 also supplied with current from the terminals 218 through the switch 216. However, the direction of the current in this field winding 220, and thus the direction of movement of the motor and the member 210 depend upon the position of the switch 216. This switch 216 is under the control of an armature 224 which is connected to the switch through a rod 226 and which lies between two solenoids 228 and 230. These two solenoids are connected together at 232 and thence are connected through normally closed contacts 234 of the relay 84 to a central contact 236 of the both-sides stable relay 142. The other ends of the two windings 228 and 230 are connected through respective limit switches 240, 242 and through respective normally closed contacts 244 and 246 of the relay 84 to respective side contacts 248 and 250 of the both-sides stable relay 142.

When the tractor is at the position 60 in FIGURE 5, the plough raising and lowering links are raised so that the plough is ineffective, and the circuit has the condition shown in FIGURE 7. On passing over the wire 51, however, the central contact 236 is moved downwards into engagement with the contact 250 so that the winding 230 is energized through the closed limit switch 242. This serves to move the rod 226 to the right so that the field winding 220 is energized and serves to move the lever 209 in such a direction as to lower the links. When the lever 209 reaches its extreme position in which the links have been fully lowered the member 201 engages and opens the limit switch 242 and closes the limit switch 240, the winding 230 thus being de-energized so that the rod 226 returns to its initial position in which the switch 216 disconnects the terminals 218 from the field and armature windings 220 and 214.

When subsequently the head 102 receives a further signal from the wire 51, at the end of a reach 43, the relay 142 acts to move the contact 236 into the illustrated position whereupon the winding 228 is energized and the motor 212 and member 210 are moved in the opposite direction to raise the links, the member 210 acting, when the links have been fully raised to open the limit switch 240 and close the limit switch 242.

The above is repeated each time the head 102 passes over the wire 51, so that the area within the dotted lines in FIGURE 5 is ploughed.

During the whole of the operation described so far the five movable contacts of the relay 84 are in their righthand positions so that the steering device is under the control of which ever pick up head is selected by the uniselector U1 and so that the plough raising and lowering links are completely under the control of the pick up head 102. However, if there is an obstacle in the field it may be desirable to steer the tractor round it by switching the pick up heads 1–5 in a manner completely independent of the switching normally employed and, furthermore, it may also be desirable to raise and lower the plough again in a manner which is independent of the raising and lowering operations normally employed. It is for this purpose that a circuit 300 is provided which is connected to the winding, shown at 301, of the relay 84 and which, on energizing this winding, causes all the movable contacts of the relay to move over to their lefthand positions, thereby disconnecting the steering device from the uniselector U1 and the electric motor 214 from the control of the pick up head 102. The signals for controlling the steering device and motor now come instead from the circuit 300 which is shown in more detail in FIGURE 11.

This circuit includes a further pick up head 310 which is similar to the others and which is mounted on the back axle of the tractor adjacent the head 102. This head 310 is connected to an amplifier 312 which is tuned to a frequency different from that of the two sources 50 and 55. This amplifier 312 is in turn connected to a relay 314 which controls the winding 316 of a both-sides-stable relay 318 having a central contact 320 and sides contacts 322 and 324.

The relay 314 is also able to short out two terminals 326 and 328 so as to cause energization of a winding U4W of a further uniselector shown diagrammatically at U4 and having an arm U4J carrying eight contact arms U4A–H respectively. The uniselector U4 has eight sets of contacts S1′–S8′ the sets being arranged in pairs.

The contacts of the sets S1′ and S2′ are connected in a predetermined fashion to busbars connected to the different pick up heads 1–5, the connections being indicated by the row of Figures R′. Thus the top lefthand contact is connected to the coil 3a of the head 3 whilst the contact below it is connected to the coil 3b. The contact arms U4A and U4B thus obtain signals from the different coils.

The contact arms U4C and U4D are connected in series to a delay circuit 330 similar to the delay circuit 152 and including a battery 332, capacitor 334, winding 336, normally closed contacts 338 and normally open contacts 340 connected across the terminals 326 and 328.

The contact arms U4E and U4F are connected through a battery 342 to the winding 301.

Finally, the arms U4G and U4H are connected to terminals 344 and 346.

The connections within the uniselector U4 are intended to cope with an obstacle 350 shown in FIGURE 10. The guidance wire 40 passes about this obstacle 350 to avoid it and to guide the tractor around it, and in addition a further wire 352 is embedded in the ground to serve as additional control of the tractor's movements. This wire 352 is energized by a source 354 of alternating current of frequency different from those of the sources 50 and 55. This source 354 is triggered by a coil 356 surrounding the wire 40 so that the source 354 is energized only when the wire 40 is.

The assumption will be made that the tractor is approaching the obstacle 350 with the head 3 in control. On reaching the first part 358 of the wire 352 the obstacle head 310 picks up a signal which is amplified by the amplifier 312 which operates the relay 314 to close the circuit which includes the winding U4W. This causes the arm U4J to move from its first to its second position. In this position the contact arms U4E and U4F are connected together to complete the circuit through the winding 301. This therefore acts to move all the moving contacts of the relay 84 to the left so that from then onwards the steering device is controlled by signals from the arms U4A and U4B whilst the motor 214 is controlled by signals under the control of the bi-stable relay 318, the terminals 344 and 346 being connected together by the arms U4G and U4H. This bi-stable relay 318 is operated by its winding 316 in such a direction as to cause the motor 212 to raise the plough raising arms 200–202. However, in the second position of the arm U4J the head 3 is still effective so the tractor continues its directly forward movement.

On reaching the next part 360 of the wire 352 the head 310 receives a further signal and, this causes the movement of the arm U4J by one step. In its new third position the winding 301 is still energized, but the arm U4G and U4H are disconnected so that no further signals can be passed through to the motor 212. Also in this position the arms U4C and U4D are connected together so that the delay circuit 330 is brought into operation in a similar manner to that previously described. This thus serves to energize the winding U4W again to move the arm U4J into its fourth position, in which the head 1 is effective. This head 1 remains effective until the third part 362 of the wire 352 is reached, whereupon the arm U4J is moved first into a fifth position, and then by means of the delay circuit 330, into its sixth position in which the head 3 is effective once more. In this sixth position the arms U4G and U4H are again disconnected so that the motor 212 cannot be operated.

On reaching the final part 364 of the wire 352 the arm U4J moves into its seventh position in which the arms U4G and U4H are connected so that now the motor 212 is operated to cause lowering of the plough. In this seventh position the contact arms U4C and U4D are connected together to bring the delay circuit 330 into action once more to move the arm U4J into its final position, which is identical to its first.

The uniselector U4 may be provided with further contacts (not shown) in order to cause the correct movement of the tractor in its subsequent circuits past the obstacle 350.

Figure 12:
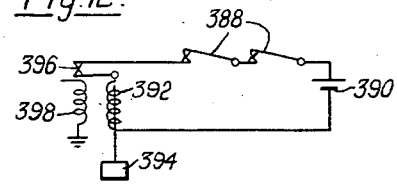
FIGURE 12 is a diagram of a circuit for controlling the fuel supply of the vehicle.
Figure 13:
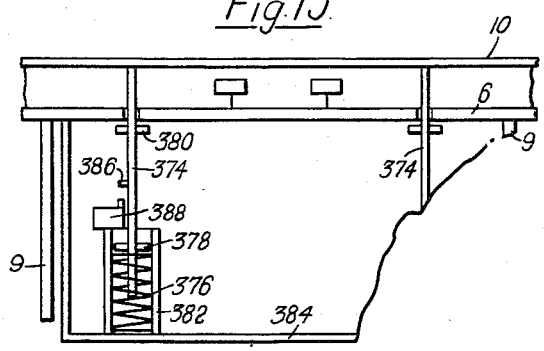
FIGURE 13 is a diagrammatic horizontal section of the front part of the tractor.

A modification may be made to effect automatic stopping of the tractor on meeting an obstacle. Such a modification is shown in FIGURES 12 and 13 where the fender 10, instead of being secured rigidly to the boom 6 by the members 9 is carried by means of arms 374 which are urged forwardly by helical compression springs 376 engaging projections 378 on the arm, the forward position of the fender 10 being reached on engagement of an abutment 380 with the rear of the boom 6. Each spring 376 is held in a cylinder 382 rigid with a cross piece 384 carried rigidly by the boom 6. Each arm 374 is provided with a further projection 386 which is arranged in alignment with a switch 388. Thus, on hitting an obstacle the fender 10 is pushed backwards with respect to the boom 6 and one or both of the switches 388 is operated to open the circuit which is shown in FIGURE 12 and which is energized by a battery 390. Thus a solenoid 392 is deenergized and thus operates a fuel supply valve 394 to cut off the fuel supply to the diesel engine driving the tractor and thus stop the tractor. If the tractor is petrol driven, the switch is arranged to switch off the ignition system or to earth the magneto, whilst if the tractor is electrically driven, the switch simply disconnects the electric power supply.

The circuit shown in FIGURE 12 can also be deenergized by the opening of 2 normally closed contacts 396. Such opening is effected when the current to a coil 398 falls below a predetermined magnitude. This current is derived from the amplifier 80 shown in FIGURE 7 and is thus dependent on the strength of whatever signals are received at the head. Thus, if for any reason the tractor stays too far away from the controlling wire so that the signal becomes weak the tractor is automatically stopped.

The circuit shown in FIGURE 7 is adequate when it is intended to employ implements of one particular width but a modification is necessary if implements having different widths are to be employed and such a modification is shown in FIGURE 14 where the parts corresponding to those in FIGURE 7 are given similar reference numerals but primed. The object of the particular modification illustrated is to enable the tractor to pull either an an ordinary plough, as with the FIGURE 7 circuit or some wider implement, such that only two circuits of each loop are required. With the modification illustrated the control of the steering device as it passes along the parallel reaches is exercised by only the heads 2 and 4 rather than by all five heads. The modification involves providing a delay circuit 152′ such that the uniselector arm U1J′ may move either in exactly the same way as the arm U1J, or alternatively moves at times in the same way as the arm U1J but at other times moves rapidly through a number of steps so as to avoid the steering device being brought under the control of the heads 1, 3 and 5.

In the uniselector U1′ the contact arms U1G and U1H are replaced by three contact arms U1K′, U1L′ and U1M′ and three sets of contacts S13, S14, S15 are provided instead of only the two sets S7 and S8. Three corresponding busbars 400–402 are provided which are connected in the illustrated fashion to the respective sets of contacts, whilst the busbars 400, 401 are connected together and thus connected to the delay circuit 152'. This delay circuit 152' is connected to the contact arms U1K', U1L', and U1M' and the busbar 402 through a manually operated switch 405 having an upper position engaging the arms U1K' and U1M', and a lower position engaging the arm U1L' and busbar 402. In the lower position of the switch 405 the whole circuit acts in an identical fashion to the whole circuit shown in FIGURE 7.

However, in the upper position of the switch 405 there is the possibility of the capacitor 164' being rendered ineffective so that the circuit 152' then acts without delay. Thus, when the arm U1J' is moved one step into its second position terminals 407 and 408 in the circuit 152' are disconnected since the arm U1M' is not then connected to the busbar 402. Thus the circuit acts immediately to close the contact 166' so that the arm U1J' is moved one step. In its new position, the same thing happens again and indeed this happens in the first eleven positions of the arm U1J'. Finally, in its twelfth position the terminals 402 and 408 are connected together again and the uniselector U1' then acts in the same manner as the uniselector U1 until the terminals 407 and 408 are disconnected again.

The delay circuit 152' acts, in fact, to ensure that the head 4 is effective in going down the lefthand part of the loop A, then the head 2 in passing up the righthand part of the loop A, the head 2 in coming down the lefthand part of the loop A for the second time, and the head 4 in moving up the righthand part of the loop A for the second time. The head 3 is again effective at the top and bottom ends of the field.

The counting uniselectors U2 and U3 must of course be modified in a similar way to ensure that the tractor moves from the loop A to the loop B after only two circuits of the former.

When more than one, and less than five, heads are used in combination it may be necessary to shift the "fixed" lateral positions of the appropriate heads to ensure that the tractor moves an equal transverse distance on its successive circuits.

Figure 15:
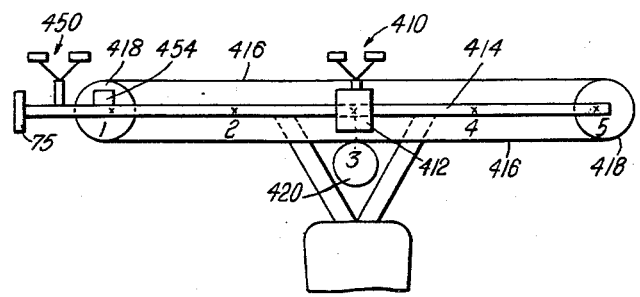
FIGURE 15 is a plan of the front of a second tractor.

FIGURES 15 and 16 illustrate a second form of the invention in which a head is provided which is moved into different lateral positions in the tractor to change the lateral position from which the control of the steering device is exercised. This head, indicated at 410 in FIGURE 15, is mounted on a support 412 which can be pulled along a boom 414 by means of a rope 416 which passes about two pulleys 418 at the ends of the boom 414 and which itself is moved by means of an electric motor 420. The head 410 has five different positions marked 1 to 5 and in each of these a limit switch is provided, these switches being indicated at 422, 424, 426, 428 and 430 in FIGURE 16, which represents a control network for moving the tractor in the same way as FIGURE 7. This network includes a uniselector U5 having nine sets of contacts with five corresponding contact arms U5A, U5B, U5C, U5D, U5E, U5F, U5G, U5H, and U5K, all mounted on a common arm U5J. The arm U5K is connected to a battery 432 and thence through the armature winding 434 of the electric motor 420 to all the limit switches which are connected through respective busbars 436 to the first set of contacts of the uniselector U5. The switches 422–430 are disposed respectively at the positions 1–5 and are connected as indicated by the row of figures R''. Thus the first contact of the first set is connected to the switch 426 which is arranged at the third position on the boom. These limit switches are normally closed but are opened when the support 412 arrives at the switch. When the arm U5J is in its first position the support 412 is at the third position and the limit switch 426 is therefore opened and the motor 420 inactive.

The second and third sets of contacts of the uniselector U5 are connected, as illustrated, to four separate busbars 440, 442, 444, 446, the busbars 440 and 446 being connected to the head 410, whilst the other busbars 442 and 444 are connected in a similar way to a further fixed head 450 which is secured rigidly to the boom 414 adjacent the position 1. With the arm U5J in its first position the arms U5A and U5B are connected to the head 410 and signals derived from the latter, in its third position, are then passed to the amplifiers 80 and 81 and thence to control the steering device.

The contact arms U5C, U5D, U5E and U5F are connected in exactly the same way as the arms U1C, U1D, U1E, and U1F, in FIGURE 7.

The arm U5G and a busbar 452 which is connected to selected contacts of the eighth set are connected across the terminals 114 and 116 (see FIGURE 7) through a normally opened switch 454 which is located at the position 1 (see FIGURE 15). This switch is closed by the support 412 whenever it arrives at this position 1.

Finally, the arm U5H and a busbar 456 to which some of the contacts of the last set are connected through a battery 458 to the winding 460 of a relay 462 having movable contacts 464 which, on energization of the winding 460 take up one position in which current flows through the field winding 466 of the motor 420 in one direction, whilst on deenergization of the winding 460 current passes through the winding 466 in the opposite direction.

The tractor moves along the wire 44 from the position 60 under the control of the head 410 in its central position. On picking up four signals, the head 75 acts, as with the circuit of FIGURE 7, to move the arm U5J one step. The limit switch 422, at the position 1, now becomes effective and the motor 420 therefore acts to move the head 410 into this position 1. At the same time, the control of the steering device passes from the head 410 to the fixed head 450 since it is this head which is now connected to the amplifiers 80 and 81.

On reaching the position 1, the switch 454 (FIGURE 16) is closed and this serves to connect the terminals 114 and 116 (FIGURE 7) so that the arm U5J is moved through a further step to its third position. In this position the limit switch 430, in position 5, is effective and the motor 420 is therefore energized to move the head 410 into the position 5. It will be noticed that as the arm U5J moves from its second to its third position the contacts 464 change over so that the direction of movement of the motor 420 reverses to move the head 410 from position 1 to position 5.

The tractor thus proceeds down the lefthand part of the loop A under the control of the head 410 in position 5.

On reaching the bottom end of the lefthand part of the loop A the pick up head 102 (FIGURE 7) acts to move the arm U5J through a further step into its fourth position, thereby moving the head 410 into position 3. The head 75, after receiving three signals, causes the arm U5J to be advanced through a further step once more bringing the fixed head 450 into control. At the same time the switch 422 is rendered effective to operate the motor 420 and thus to move the head 410 into position 1. By virtue of the connection between the contact U5G and the busbar 452 the arm U5J is then moved through a further step in which the switch 422 is still effective. The tractor thus moves up the righthand part of the loop A under the control of the head 410 in position 1.

The whole process is repeated five times (not all the contacts of the uniselector U5 being shown), and the process may be repeated for the different loops as with the circuit previously described.

In the same way as the position of the "fixed" heads of the first tractor can be altered to accommodate the use of implements of varying widths, so the limit switches 422, 430 on the boom can be moved to select alternative positions for the travelling head 410.

It will be appreciated that in the case of a large field, where considerable lengths of wire have to be energized the electrical power input required for the two sources 50 and 55 may be considerable, and when a mains supply is not available for this purpose a portable generator set or high capacity batteries may be employed. The power input to each of the sources 50 and 55 should be sufficient to provide current through the various wires of the order of ¼ ampere. To reduce the size and cost of the sources 50 and 55 and their power sources, the signal output of each source may be in the form of short pulses of alternating current with a duration of, for example, a twentieth of a second at half-second intervals. Alternatively, or in addition, the guidance system may be divided into electrically isolated sections each of which can be separately energized on human intervention, again with a subsequent reduction in power input required.

Although ploughing has been specifically referred to, it will be appreciated that various other operations such as seeding, hoeing, manure spreading and so on could also be performed with the aid of the tractors described.

All the different batteries and sources of power for energizing the networks shown in FIGURES 7 and 15 may, of course, be constituted simply by the ordinary tractor battery.

We claim:

1. A vehicle having a steering device under the control of a head able to pick up signals emitted by a conducting wire to cause the vehicle automatically to follow a plurality of different paths defined by the wire, said head having a number of different effective positions so as to pick up respective signals emitted at different laterally spaced positions, respectively, and signal responsive means on the vehicle for changing the lateral position from which the control of the steering is exercised to cause said vehicle to traverse a different one of said plurality of different paths, respectively, so that said vehicle in successively traversing said different paths travels a multiple of the length of said conducting wire.

2. An electrical guidance system for a vehicle according to claim 1, comprising conducting wire embedded in the ground, said wire forming a pair of parallel reaches and connecting pieces joining the adjacent ends of said reaches to define a substantially four-sided loop for emitting signals and defining a substantially four-sided path for said vehicle, and also comprising conductors disposed at the ends of said reaches and able to emit other signals to control the said signal responsive means.

3. An electrical guidance system for a vehicle according to claim 1, comprising conducting wire embedded in the ground, said wire forming a plurality of pairs of parallel reaches and respective connecting pieces joining the adjacent ends of the said reaches of each loop to define a plurality of substantially four-sided loops for emitting signals and defining a plurality of substantially four-sided paths for the said vehicle, each of said loops including within its area a part of another of said loops and the connecting pieces of the different loops being aligned with one another, and also comprising conductors in the form of wire embedded in the ground and extending across the said reaches adjacent the ends of said reaches, said conductors being able to emit other signals to control the said signal responsive means.

4. A system according to claim 3, said conductors in the form of wire being connected ot an electrical signal source.

5. A system according to claim 4, wherein the two electrical signal sources are of different frequencies.

6. A system according to claim 3, said connecting pieces constituting a common head wire connected to all of said reaches and a common foot wire connected to all or said reaches.

7. A system according to claim 6, one end of each reach of each loop curving gently into the said head wire, and the opposite end of the said reach and the adjacent end of the other reach of the loop approaching the said foot wire and the said wire respectively in a re-entrant fashion.

8. A system according to claim 6, and including an electrical signal source connected to said head and foot wires.

9. A system according to claim 8, wherein two electrical signal sources are of different frequencies.

10. A system according to claim 9, wherein the two electrical signal sources are pulse generators.

11. A vehicle having a steering device under the control of a head able to pick up signals emitted by a conducting wire to cause the vehicle to automatically and successively follow a plurality of different paths defined by said wire, said head having a number of laterally spaced positions corresponding to said paths, respectively, and the vehicle having means to change, in response to a signal, the lateral position from which the control of the steering is exercised.

12. A vehicle comprising a frame, wheels carrying said frame, a steering device connected to steer said wheels, electromagnetic pick-up head means mounted on said frame and arranged to control said steering device to keep said vehicle to a predetermined path, said pick-up head means having a plurality of different effective positions in said vehicle and being directed in said different effective positions towards different lateral locations with respect to said vehicle, and signal-responsive means independent of said steering device, and connected to switch said head means from one effective position to another.

13. A vehicle according to claim 12, wherein said different positions are spaced laterally in said vehicle.

14. A vehicle comprising a frame, wheels carrying said frame, a steering device connected to steer said wheels, a first electromagnetic pick-up head means mounted on said frame and arranged to control said steering device to keep said vehicle to a predetermined path, said pick-up head means having a plurality of different effective positions in said vehicle and being directed in said different effective positions towards different lateral locations with respect to said vehicle, and a second electromagnetic pick-up head means separate from the first electromagnetic pick-up head means and connected to switch the first electromagnetic pick-up head means from one effective position to another.

15. In a vehicle guidance system in which the vehicle is caused to traverse a given area by traveling over a plurality of relatively parallel strip zones making up said given area, electric means for establishing a guidance field defining the boundary of said given area, and means on the vehicle for causing same to utilize said guidance field a multiple number of times to cause said vehicle to traverse different ones of said strip zones until the vehicle has traversed said given area.

16. In a vehicle guidance system in which a vehicle is caused to traverse a given path by said guidance system, said guidance system including, electric means for producing a guidance field establishing a plurality of vehicle traversable paths including said given path, said given path being spaced from said guidance field, detector means on said vehicle having a number of different effective positions relative to said vehicle, each position corresponding to one of said vehicle traversable paths, respectively, including said given path, and means for shifting the effective position of said detector means to the one corresponding to said given path.

17. The guidance system defined in claim 16 in which said detector means includes a pick-up head, and means for shifting said pick-up head to said different effective positions.

18. The guidance system defined in claim 16 wherein the effective positions of said detector means are spaced laterally of the vehicle.

19. The guidance system defined in claim 18 in which said detector means includes a pick-up head at each of said positions and each being rendered effective separately and independently.

20. The guidance system defined in claim 18 in which said detector means includes a pick-up head, and means for shifting said pick-up head to said laterally spaced effective positions.

21. A vehicle comprising a frame, wheels carrying said frame, a steering device connected to steer said wheels, an electromagnetic pickup head mounted on said frame and arranged to control said steering device to keep said vehicle to a first path defined by an electrical guidance field, means for moving said head into different spaced positions on said vehicle, each spaced position corresponding to a different path for the vehicle so that said electrical guidance field is traversed a multiple number of times by said pick-up head.

22. A vehicle according to claim 21, and including a fixed electromagnetic pick-up head fixed on said frame, a uniselector, said uniselector connecting said fixed head to control said steering device on receipt by said fixed head of a predetermined number of signals.

23. A vehicle comprising a frame, wheels carrying said frame, a steering device connected to steer said wheel, an electromagnetic pick-up head mounted on said frame and arranged to control said steering device to keep said vehicle to a predetermined path, a motor connected to move said head into different laterally spaced positions in said vehicle, and signal responsive means arranged to operate said motor.

24. A vehicle according to claim 23, and including a uniselector having a predetermined programme, said uniselector being controlled by said signal responsive means and controlling said motor.

25. A vehicle according to claim 23, and including a boom extending across said vehicle and carrying said pick-up head.

26. A vehicle according to claim 23, said signal responsive means including an electromagnetic counting pick-up head and a counting device connected to said counting head and to said motor to operate said motor after receipt by said counting head of a predetermined number of signals.

27. A vehicle according to claim 24, and including a fixed electromagnetic pick-up counting head fixed on said frame, said uniselector connecting said fixed head to control said steering device on receipt of said counting head of a predetermined number of signals.

28. A vehicle according to claim 22, and including a manually operable switch connected to said uniselector and having one position defining a first predetermined programme for said uniselector and having a second position defining a second predetermined programme for said uniselector.

29. A vehicle comprising a frame, wheels carrying said frame, a steering device connected to steer said wheels, a control circuit arranged to control said steering device to keep said vehicle to a predetermined path, said circuit including a plurality of electromagnetic pick-up heads mounted on said frame in a plurality of different laterally spaced positions and a switching means disposed between said heads and said steering device and operable to connect selectively different heads to control said steering device, and signal-responsive means connected to operate said switching means.

30. A vehicle according to claim 29, said signal responsive means including an electromagnetic counting pick-up head and a counting device connected to said counting head and to said switching means to operate said switching means in a predetermined sequence.

31. A vehicle according to claim 30, said counting device having a predetermined programme to operate said switching means in response to different predetermined programmes.

32. A vehicle according to claim 29, said switching means comprising a uniselector having a predetermined programme.

33. A vehicle according to claim 32, and also comprising a further electromagnetic obstacle head mounted on said frame and a second uniselector controlled by said obstacle head and having a predetermined programme different from the predetermined programme of the first uniselector, said obstacle head acting on energization thereof to connect said plurality of heads selectively to control said steering device in accordance with predetermined programme of said second uniselector and to disconnect said plurality of heads from the first uniselector.

34. A vehicle according to claim 32, and including a manually operable switch connected to said uniselector and having one position defining a first predetermined programme for said uniselector and having a second position defining a second predetermined programme for said uniselector.

35. A tractor comprising a vehicle according to claim 32, and comprising an electromagnetic trip head connected to operate said uniselector to connect the central one of said plurality of electromagnetic pick-up heads to control said steering device.

36. A tractor comprising a vehicle according to claim 32, and comprising an electromagnetic trip head mounted on said frame and an implement raising and lowering device controlled by said trip head to move in alternate directions on receipt of signals by said trip head.

37. A tractor comprising a vehicle according to claim 32 further including an implement raising and lowering device on the tractor and an electromagnetic trip head, said trip head being connected so as both to operate said uniselector to cause said uniselector to connect the central one of said plurality of electromagnetic pick-up heads to control said steering device and also to control said implement raising and lowering device to move in alternate directions on receipt of predetermined signals by said trip head.

38. An electrical guidance system for causing a vehicle to traverse a given area comprising, in combination, a first electrical vehicle guidance conductor distributed so as to substantially correspond to the perimetrical shape of the said given area, a plurality of second electrical vehicle guidance conductors defining substantially similarly shaped separate areas within the bounds of and smaller than said given area, an electrical control means at selected points along each of said guidance conductors to form a control point at each of said crossings, means for exciting said conductors and electrical control means with electrical currents and with at least a distinctively different current for said electrical control means, and means on said vehicle responsive to electrical current in said electrical control means at said control points to cause the vehicle to traverse a different path than the one it had just traversed as defined by current in one of said guidance conductors, and so on, until each area is traversed by the vehicle with each guidance conductor controlling the vehicle a multiple number of times.

39. The guidance system defined in claim 38 wherein said electrical control means is an electrical conductor crossing said guidance conductors at said control points.

40. An electrical guidance system for directing a vehicle to traverse a given area comprising, in combination, a first electrical guidance conductor distributed so as to substantially correspond to the perimetrical shape of the said given area, a plurality of second electrical guidance conductors defining substantially similarly shaped separate areas within the bounds of and smaller than said given area, a control electrical conductor crossing said guidance conductors to form a control point at each of said crossings, and means for exciting said conductors and electrical control connector with electrical currents and with at least a distinctively different current for said electrical control means.

41. An electrical guidance system for directing a vehicle to traverse a given area comprising, in combination a first electrical conductor guidance means distributed so as to substantially correspond to the perimetrical shape of the said given area, a plurality of second electrical conductor guidance means defining separate areas within the bounds of and smaller than said given area, an electrical control conductor system crossing said conductor guidance means to form a control point at each of said crossings, and means for exciting said guidance conductor means and control conductor system with electrical currents and with at least a distinctively different current for said control conductor system.

References Cited in the file of this patent
UNITED STATES PATENTS

| | | |
|---|---|---|
| 2,317,400 | Paulus et al. | Apr. 27, 1943 |
| 2,339,291 | Paulus et al. | Jan. 18, 1944 |
| 2,493,755 | Ferrill | Jan. 10, 1950 |
| 2,803,743 | Ballerait | Aug. 20, 1957 |
| 2,816,516 | Diehl | Dec. 17, 1957 |
| 2,847,080 | Zworykin et al. | Aug. 12, 1958 |